US012734725B2

(12) United States Patent
Kenel et al.

(10) Patent No.: US 12,734,725 B2
(45) Date of Patent: Sep. 15, 2026

(54) METHOD OF FORMING A CONTACT PIECE FOR A CIRCUIT BREAKER

(71) Applicant: ABB Schweiz AG, Baden (CH)

(72) Inventors: Christoph Kenel, Baden (CH); Markus Hoidis, Niederrohrdorf (CH); Thierry Delachaux, Zürich (CH)

(73) Assignee: ABB Schweiz AG, Baden (CH)

( * ) Notice: Subject to any disclaimer, the term of this patent is extended or adjusted under 35 U.S.C. 154(b) by 152 days.

(21) Appl. No.: 18/679,830

(22) Filed: May 31, 2024

(65) Prior Publication Data

US 2024/0399619 A1 Dec. 5, 2024

(30) Foreign Application Priority Data

May 31, 2023 (EP) .................................... 23176273

(51) Int. Cl.

*B28B 1/00* (2006.01)
*B28B 11/00* (2006.01)
*C22C 1/10* (2023.01)
*C22C 29/00* (2006.01)
*C22C 29/08* (2006.01)

(52) U.S. Cl.

CPC ............ *B28B 1/007* (2013.01); *C22C 1/1026* (2013.01); *C22C 29/005* (2013.01); *C22C 29/08* (2013.01); *B28B 11/00* (2013.01)

(58) Field of Classification Search

CPC ..... B29B 1/007; C22C 1/1026; C22C 29/005; C22C 29/08; B28B 11/00

See application file for complete search history.

(56) References Cited

U.S. PATENT DOCUMENTS

| | | | | |
|---|---|---|---|---|
| 4,530,815 | A * | 7/1985 | Inagaki | H01H 1/0231 419/38 |
| 2002/0144773 | A1* | 10/2002 | Richmond | C04B 35/573 156/307.3 |
| 2017/0100857 | A1* | 4/2017 | Bai | B29C 39/003 |
| 2024/0082912 | A1* | 3/2024 | Mack | B22F 3/1143 |

FOREIGN PATENT DOCUMENTS

| | | | | |
|---|---|---|---|---|
| CN | 109482885 A | * | 3/2019 | C22C 1/0425 |
| CN | 109482885 B | | 5/2021 | |

OTHER PUBLICATIONS

Röthlisberger et al., "Ice-Templated W—Cu Composites with High Anisotropy," *Nature Scientific Reports,* 9(1): 476: 9 pp. (Jan. 24, 2019).

(Continued)

*Primary Examiner* — Nahida Sultana

(74) *Attorney, Agent, or Firm* — Fitch Even Tabin & Flannery LLP

(57) ABSTRACT

A method for forming a contact piece for a circuit breaker, the contact piece comprising a reinforcement phase and a conductive phase, the method comprising: providing a slurry of the reinforcement phase in liquid; freeze casting the slurry, to form a cast comprising a frozen liquid structure and a reinforcement phase structure; removing the frozen liquid structure from the cast, to form a foam comprising the reinforcement phase structure; sintering the foam, to form a sintered foam; and infiltrating the sintered foam with the conductive phase, to form a piece part.

14 Claims, 3 Drawing Sheets

(56) References Cited

OTHER PUBLICATIONS

Zhang et al., "Ice-templated porous tungsten and tungsten carbide inspired by natural wood," *J. of Materials Science & Technology* (JMST), 45: 25 pp. (May 15, 2020).

European Patent Office, Extended European Search Report in European Patent Application No. 23176273.3, 7 pp. (Nov. 24, 2023).

Zhang et al., "Ice-templated porous tungsten and tungsten carbide inspired by natural wood", Journal of Materials Science & Technology, vol. 45, pp. 187-197 (2020). DOI: 10.1016/j.jmst.2019.10.021.

* cited by examiner

METHOD OF FORMING A CONTACT PIECE FOR A CIRCUIT BREAKER

CROSS-REFERENCE TO RELATED APPLICATIONS

The instant application claims priority to European Patent Application No. 23176273.3, filed May 31, 2023, which is incorporated herein in its entirety by reference.

FIELD OF THE DISCLOSURE

The present disclosure generally relates to method of forming a contact piece for a circuit breaker, a method of forming a contact for a circuit breaker, a contact piece for a circuit breaker, and contact for a circuit breaker.

BACKGROUND OF THE INVENTION

Conventional contact materials for circuit breakers are typically produced by powder metallurgy involving blending, pressing and sintering and/or infiltration. The resulting materials have a random distribution of reinforcement phase. Extruded materials have some anisotropy in the extrusion direction, but the structure is not controlled.

Thermal and electrical conductivity of contact materials significantly drops at higher reinforcement levels as any reinforcement has typically a much lower electrical and thermal conductivity compared to copper or silver (WC: ~110 W/mK, ~4.5 MS/m; Cr: 69 W/mK, 8 MS/m vs. Cu: 398 W/mK, 58 MS/m; Ag: 429 W/mK, 63 MS/m). When the reinforcement is randomly distributed in the structure at high percentage for switching performance, the resulting composite has an isotropic low conductivity whereas a typical application as flat contact material would require a large conductivity through the contact while laterally this is less important. As contacts are also not completely consumed during their lifetime, the excessive amount of reinforcement phase in the bulk material unnecessarily increases electric losses, while providing no benefit to switching performance.

BRIEF SUMMARY OF THE INVENTION

The present disclosure generally describes an improved contact piece for a circuit breaker. In a first aspect, there is provided a method of forming a contact piece for a circuit breaker. The contact piece when formed comprises a reinforcement phase and a conductive phase. The method of forming the contact piece comprises: providing a slurry of the reinforcement phase in liquid; freeze casting the slurry, to form a cast comprising a frozen liquid structure and a reinforcement phase structure; removing the frozen liquid structure from the cast, to form a foam comprising the reinforcement phase structure; sintering the foam, to form a sintered foam; and infiltrating the sintered foam with the conductive phase, to form a piece part.

BRIEF DESCRIPTION OF THE SEVERAL VIEWS OF THE DRAWING(S)

FIGS. *6a* and *6b* are graphs of calculated composite conductivity values in accordance with the disclosure.

DETAILED DESCRIPTION OF THE INVENTION

FIGS. 1-5, *6a*, and *6b* relate to a method of forming a contact piece for a circuit breaker, a method of forming a contact for a circuit breaker, a contact piece for a circuit breaker, and contact for a circuit breaker.

Figure 1:
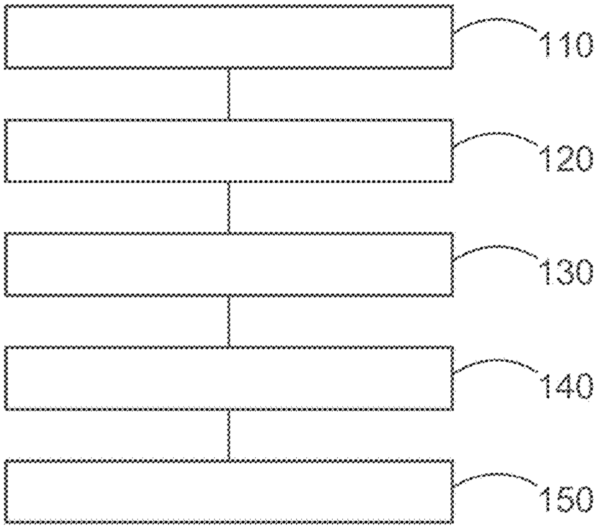
FIG. 1 is a flowchart for a method of forming a contact piece for a circuit breaker in accordance with the disclosure.

FIG. 1 shows an example method 100 of forming a contact piece 1 for a circuit breaker. The contact piece when formed comprises a reinforcement phase and a conductive phase. The reinforcement phase can be formed from a refractory material, and the conductive phase can be formed from a conductive material. The method of forming the contact piece comprises: providing 110 a slurry of the reinforcement phase in liquid; freeze casting 120 the slurry, to form a cast comprising a frozen liquid structure and a reinforcement phase structure; removing 130 the frozen liquid structure from the cast, to form a foam comprising the reinforcement phase structure; sintering 140 the foam, to form a sintered foam; and infiltrating 150 the sintered foam with the conductive phase, to form a piece part.

It is to be noted reference to "liquid" above, and hereafter refers to the same liquid (e.g. water, camphene or other solvent). Thus, it is the same liquid that is being referred to in other words the liquid (e.g. water, camphene or other solvent that can be a mixture of solvents) used to provide the slurry of the reinforcement phase is then the same liquid being referred to thereafter.

In an example, the liquid is a solvent. In an example, the liquid is an organic solvent. In an example, the liquid comprises a plurality of solvents. In an example, the liquid comprises camphene or is camphene. In an example, the liquid comprises water, is water, or is deionized water.

It is to be noted, that one or more solvents can be selected as required in order to provide the slurry of the reinforcements phase, that is then freeze casted to form the cast, from which the liquid is removed to form the foam having the required reinforcement phase structure. Thus, the final structure can be controlled as required, through selection of the specific liquid to be utilized formed from the required solvent or solvents.

In an example, the removing the frozen liquid is carried out under vacuum. In an example, the removing the frozen liquid is carried out in an inert gas atmosphere. In an example, the removing the frozen liquid is carried out in a reducing gas atmosphere. In an example, the removing the frozen liquid is carried out at a temperature of 400 C to 800 C.

Thus, water as the liquid can be utilized, and there is no requirement as such to use a reducing gas or temperatures of 400-800 C when water is used, however these conditions can be utilized for water and can help with respect to the utilization for other liquids/solvents as required.

In an example, sintering the foam is carried out at a temperature of 400 C to 2000 C.

It is to be noted that certain materials, especially when used in fine form can be sintered at very low. Again, the sintering temperature can be material specific, where for example for WC it is rather high, but that is reinforcement-specific. It is also to be noted that additives can be used to reduce the sintering temperature.

In an example, infiltrating the sintered foam with the conductive phase is carried out at a temperature of 1100 C to 1800 C.

According to an example, the providing 110 the slurry of the reinforcement phase in liquid, comprises mixing a powder of the reinforcement phase and liquid.

In an example, the powder of the reinforcement phase comprises particulates of diameters less than 1 μm in diameter.

In an example, the powder of the reinforcement phase comprises particulates of diameters 300 nm to 1000 nm in diameter.

The particulates can all have a diameter that is substantially the same, e.g. all ~500 nm or all ~800 nm, or can have an intentional range of diameters.

In an example, the particulates of the powder of the reinforcement phase were made electrostatically repulsive by surface charging with anions.

In an example, steric stabilization was used in addition by adding a surfactant.

In an example, a viscosity of the slurry was controlled by adding HPMC, a liquid-soluble methylcellulose ether containing methoxy and hydroxypropyl groups, as a thickening agent, to the reinforcement phase in liquid. This prevents gravitational sedimentation of the particulates of the powder during the freeze casting.

The HPMC is in effect a binder and could alternatively be polyethylene glycol, polyvinyl alcohol, sucrose, or guar gum. In an example, the binder is 0.5% to 20% of the mass of the liquid.

According to an example, the freeze casting 120 the slurry comprises freezing the slurry to form the frozen liquid structure comprising frozen liquid lamellas.

According to an example, the freeze casting 120 the slurry comprises freezing the slurry to form the reinforcement phase structure comprising an anisotropic foam of the reinforcement phase.

According to an example, the freeze casting the slurry comprises freezing the slurry on a surface of a cold plate to form the cast. A contact surface 2 of the contact piece 1, when formed, corresponds to a surface of the cast facing away from the surface of the cold plate.

In an example, the freeze casting the slurry comprises freezing the slurry on a surface of a cold plate to form the cast. A contact surface 2 of the contact piece 1, when formed, corresponds to a surface of the cast facing towards the surface of the cold plate.

In an example, forming the contact piece 1 comprises splitting the formed piece part into two discs-thus providing in effect two contact pieces 1.

According to an example, the freeze casting the slurry comprises controlling a cooling rate of the slurry to control one or more structure sizes of the frozen liquid structure.

According to an example, the frozen liquid structure comprises frozen liquid lamellas, and the freeze casting the slurry comprises controlling the cooling rate of the slurry to control a thickness of the frozen liquid lamellas and/or controlling the cooling rate of the slurry to control a spacing between the frozen liquid lamellas.

In an example, the cooling rate of the slurry is controlled to be 1 C/min. In an example, the cooling rate of the slurry is controlled to be 2 C/min. In an example, the cooling rate of the slurry is controlled to be 5 C/min. In an example, the cooling rate of the slurry is controlled to be between 2 C and 5 C/min. In an example, the cooling rate of the slurry is controlled to be 10 C/min. In an example, the cooling rate of the slurry is controlled to be between 5 C and 10 C/min. In an example, the cooling rate of the slurry is controlled to be 20 C/min. In an example, the cooling rate of the slurry is controlled to be between 10 C and 20 C/min. In an example, the cooling rate of the slurry is controlled to be 50 C/min. In an example, the cooling rate of the slurry is controlled to be between 20 C and 50 C/min. In an example, the cooling rate of the slurry is controlled to be 100 C/min. In an example, the cooling rate of the slurry is controlled to be between 50 C and 100 C/min.

In an example, the cooling rate of the slurry is controlled to vary in magnitude during freeze casting the slurry. According to an example, the cooling rate of the slurry is controlled by a temperature of the cold plate and/or a rate of change of temperature of the cold plate.

According to an example, the removing 130 the frozen liquid comprises sublimating the frozen liquid from the cast.

According to an example, the removing 130 the frozen liquid comprises freeze drying the cast.

According to an example, the reinforcement phase comprises W, or WC, or Cr. According to an example, the conductive phase comprises Cu, or Ag. In an example, the reinforcement phase is W, or WC, or Cr; and wherein the conductive phase is Cu, or Ag.

In an example, the powder of W, or WC, or Cr comprises particulates of diameters less than 1 μm in diameter. In an example, the powder of W, or WC, or Cr comprises particulates of diameters 300 nm to 500 nm in diameter.

According to an example, the method comprises machining the contact piece to form a finished contact piece. Following on from forming a contact piece, the contact piece 1 can be connected to a contact stem 2 to form a contact.

Thus, an exemplar method of forming a contact for a circuit breaker is as follows. The contact when formed comprises a contact piece 1 and a contact stem 3. The method of forming a contact comprises: forming the contact piece as described above with respect to FIG. 1; and connecting the contact piece to the contact stem.

In an example, the connecting the contact piece to the contact stem comprises brazing the contact piece to the contact stem.

In an example, the method comprises machining the contact piece to form a finished contact piece prior to connecting the finished contact piece to the contact stem.

In an example, the method comprises machining the contact piece after connecting the contact piece to the contact stem.

In an example, the method comprises machining the contact stem after connecting the contact piece to the contact stem.

In an example, the method comprises machining the contact after connecting the contact piece to the contact stem.

As made clear, a contact piece for a circuit breaker can be formed as described above.

As made clear, a contact for a circuit breaker can be formed as described above.

Thus, freeze casting of the reinforcement phase (e.g. tungsten carbide or Cr) followed by freeze drying, sintering and infiltration with Cu or Ag as metal matrix is used to form a contact piece. This method yields WCCu, WCAg, or CuCr contact piece material composites with a controlled anisotropic structure consisting of reinforced walls and pure metal channels that provide directionally higher electrical and thermal conductivity. While man-made, this class of composites are considered bio-/wood-inspired due to their efficient use of reinforcement phase for maximum effect, but only where it is needed while allowing fast transport in parallel directions. These materials can be used to improve thermal and electrical transport in the back side of contact pieces, directly as bulk contact material or with a gradient structure providing a reinforced contact piece surface with channels of increasing size on the backside.

In accordance with the present disclosure, freeze casting can be used to make contact pieces for circuit breakers. Freeze casting has been originally developed by NASA as a technology to produce ceramic parts. Meanwhile it has been established as a production method for a wide range of products from filters to battery electrodes and anisotropic composites. Exploiting the tendency of water ice to form in a pure form and to expel all impurities, freeze casting allows cheaply producing self-assembled anisotropic foams from water-based slurries upon controlled freezing. In effect, as the water freezes, it expels "contaminants" to leave pure frozen water—the "contaminants" then are located outside of lamellas of frozen water, and thus structures of refractory materials can be formed that can then have conductive material infiltrated into the gaps where the frozen water was, after it has been removed. This can be utilized for other liquids to water, such as Camphene and other solvents.

Thus, the frozen structure consists of pure ice lamellas and frozen slurry in between. Upon freeze drying the ice is sublimated and removed, leaving behind an anisotropic foam of the reinforcement phase (here W, WC or Cr). This is then sintered to provide enough strength for the structure to survive infiltration by liquid Cu or Ag. The beauty of the process lies in the simple control of lamella thickness and spacing by controlling the freezing rate, which in turn is controlled by the temperature of the cold plate the slurry is frozen on. This allows control on the micrometer scale with temperature as macroscopic control variable.

The description here, for simplicity focusses on a freeze cast WCCu that has been produced and tested as vacuum interrupter material.

Figure 2:
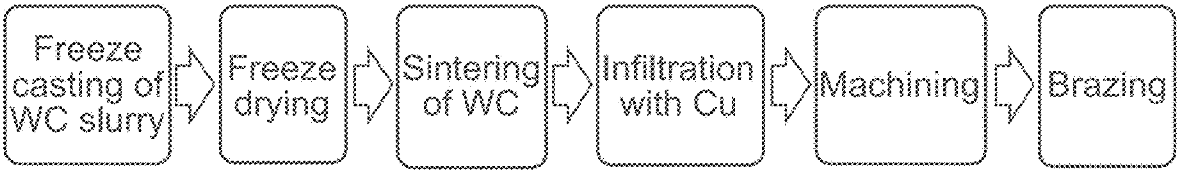
FIG. 2 is a process diagram for a freeze cast contact material process chain to form or manufacture a contact from specific materials in accordance with the disclosure.

The process chain is shown in FIG. 2, which shows a freeze cast contact material process chain, which shows process steps to produce anisotropic WCCu by creating a WC foam for Cu infiltration. WC is used as fine powder, like for conventional contact materials. Cu is used as bulk material in infiltration. The same process chain can be used to produce other contact materials such as CuCr or AgWC or WCu, or WAg or CrAg.

Continuing with FIG. 2 the process steps are the same for other reinforcement phases. Also note that, apart from the first two steps including freezing and drying, this process is the same as for conventional infiltrated contact materials.

Figure 3:
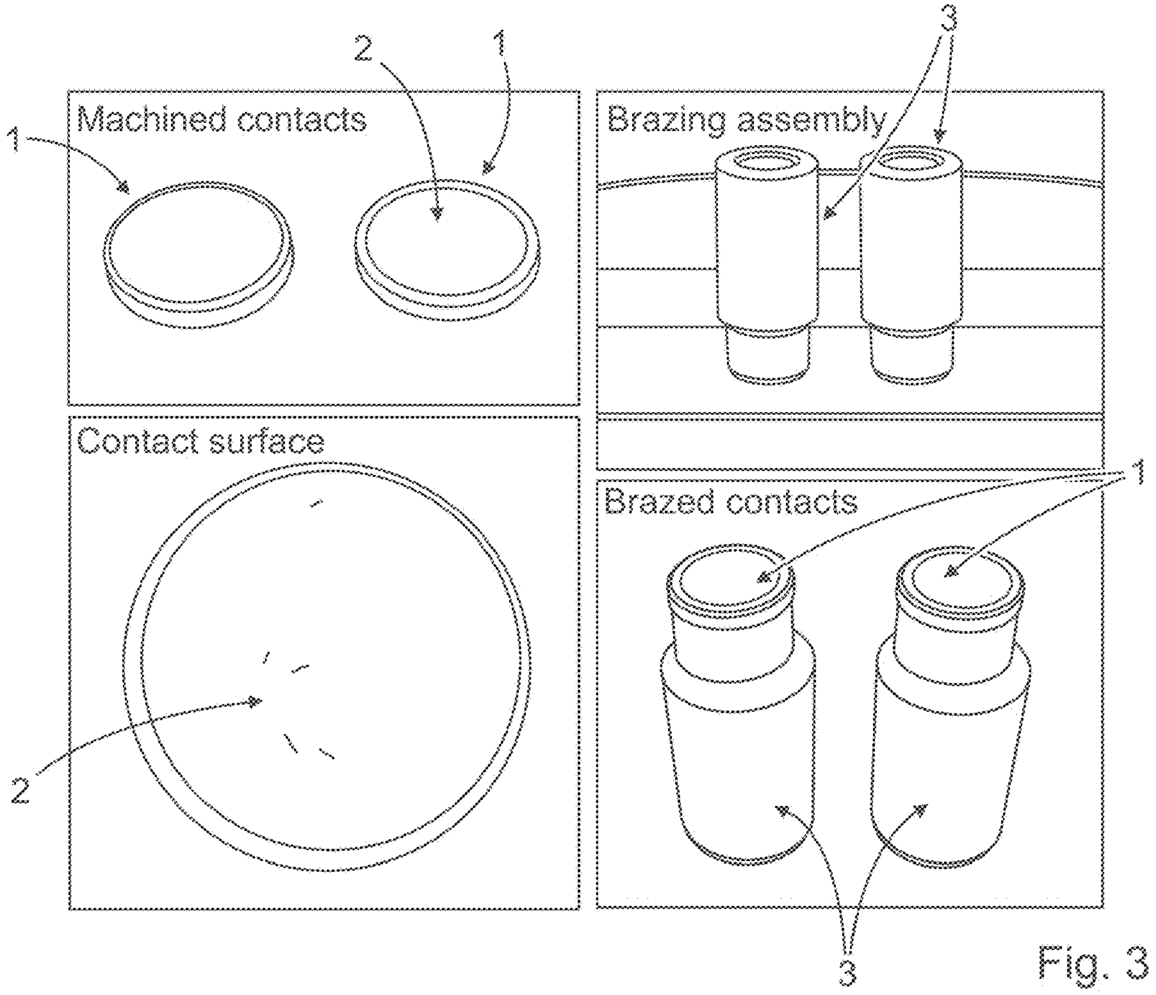
FIG. 3 is a group of images showing examples of contact pieces, contact stems and finished contacts in accordance with the disclosure.

FIG. 3 shows pictures from contacts for chop testing. FIG. 3 shows contacts, with freeze cast WCCu contacts manufactured, machined and finally brazed to Cu stems for electric testing. In the contact process the lamellas are oriented perpendicular to the contact surface.

Figure 4:
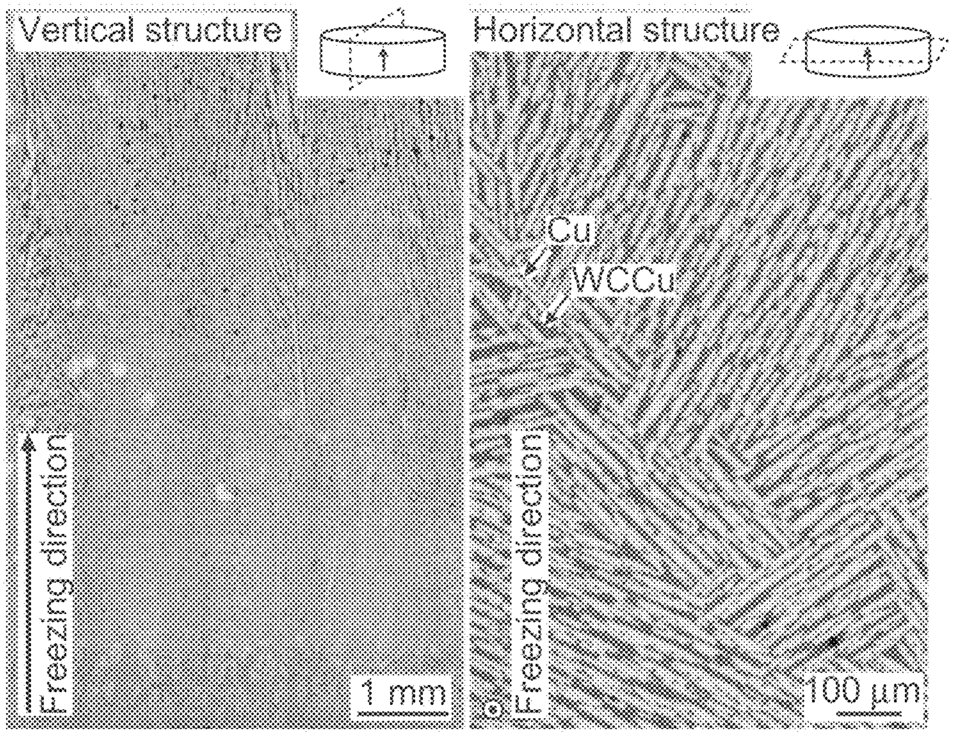
FIG. 4 are two enlarged views of freeze cast microstructures in accordance with the disclosure.

The resulting microstructure is shown in FIG. 4. FIG. 4 shows the microstructure of freeze cast and infiltrated WCCu. Orientations are shown in relation to the contact disk shape. On the left: vertical cross section parallel to the freezing direction with fine lamellas grown from bottom to top creating a "wood-like" structure. On the right: horizontal section perpendicular to the freezing direction showing the WCCu lamellas separated by pure Cu channels. This structure is also present on the contact surface. The Cu channels increase thermal and electrical conductivity in the out of plane direction.

Continuing with FIG. 4 in a side view the vertical "wood-like" structure is visible of the thin WC lamellas grown during freezing. A horizontal cut shows the lamellas in top view with the pure Cu channels in between. This structure is also present on the contact surface in this case.

Figure 5:
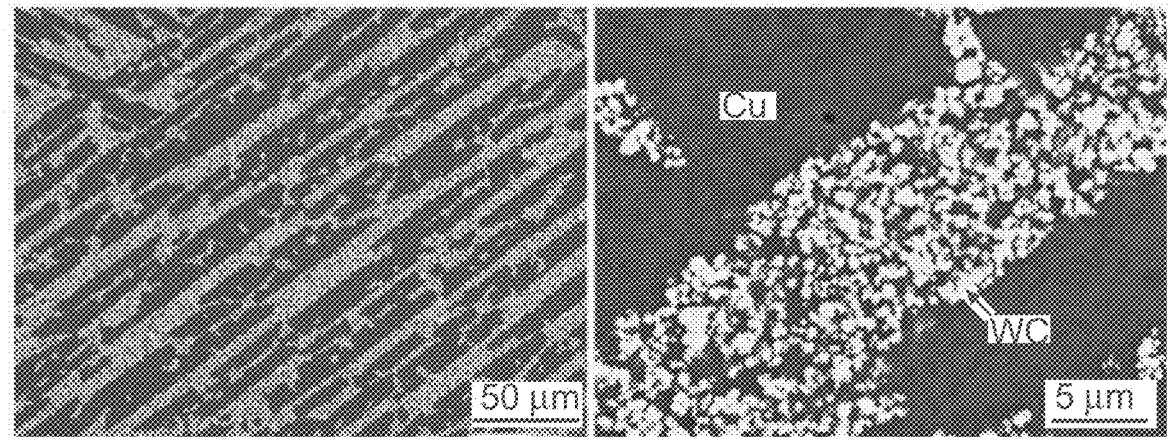
FIG. 5 are two enlarged views of exemplary Reinforcement microstructures in accordance with the disclosure.

FIG. 5 shows reinforcement microstructure, from an electron microscopy micrograph of the lamellar WCCu/Cu structure. WCCu walls consist of <1 μm WC with the spaces filled by Cu during infiltration. Channels between WCCu walls are filled with Cu. WC appears bright, Cu appears as grey. Here the WC has not been sintered strongly to preserve the fine structure for visibility Thus, FIG. 5 shows electron microscopy data where the heavy WC appears bright and the Cu matrix grey. Note that sintering is adapted in such a way to preserve the fine structure of WC as it is found in commercial WCAg or experimental WCCu contacts.

Figure 6A:
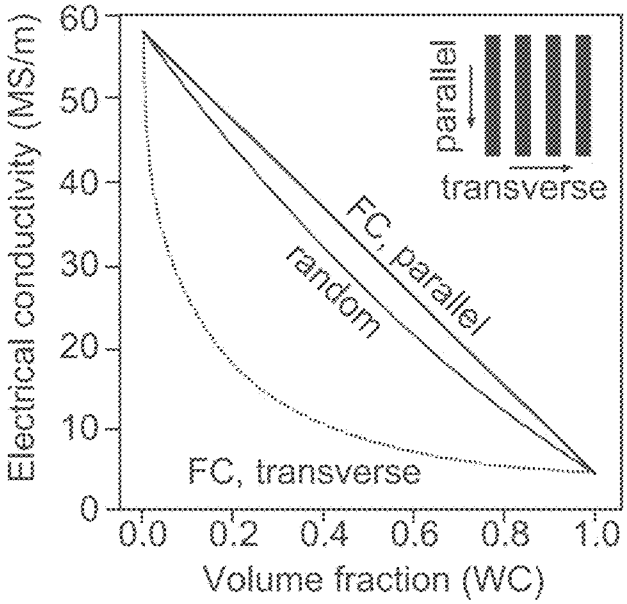
Figure 6B:
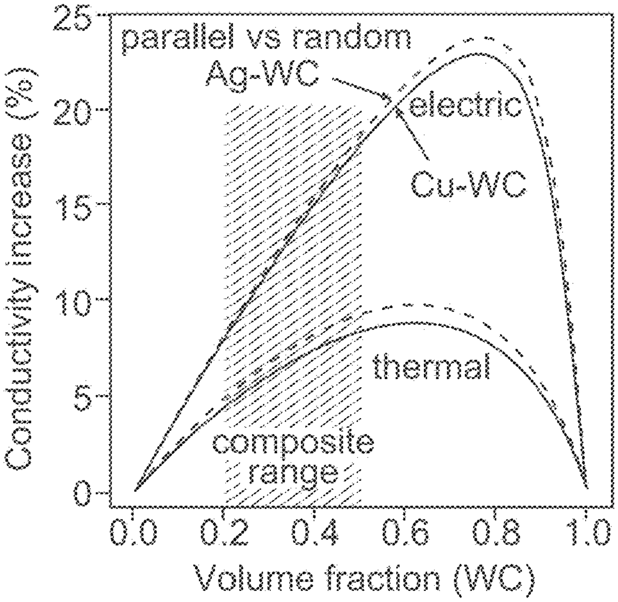

FIGS. 6*a* and 6*b* show Composite conductivity. FIG. 6*a* shows calculated electrical conductivity for freeze cast and random CuWC using established composite models. Calculations for freeze cast material are based on parallel and transverse slab models. The conductivity of a random composite is calculated using the Maxwell model assuming spherical WC particles in a Cu matrix. The difference between transverse and parallel conductivity allows to design parts with optimized properties by aligning the lamellas accordingly.

FIG. 6*b* shows conductivity increase of the parallel direction in freeze cast Cu-WC and Ag-WC compared to the random composite of equal composition. Ceramic WC has a low electrical but comparably high thermal conductivity. Thus, the improvement by aligning the freeze cast lamellas is greater for electrical compared to thermal conductivity. In the typical composite range of 20-50 vol % WC, freeze cast contact material in the parallel orientation can offer a 5-9% increase in thermal, and 7-18% increase in electrical conductivity compared to a random composite.

Thus, FIGS. 6*a* and 6*b* show the difference between a freeze cast lamellar structure and a random structure (like a commercial contact material) in terms of electrical and thermal conductivity calculated with established models for these structures. Freeze cast material in the parallel direction has 7-18% higher electric conductivity compared to a randomly structured conventional contact at the same composition. This effect becomes more pronounced with increased levels of reinforcement phase (i.e. higher Cr or WC content).

Thus, a new technique has been developed for the forming or manufacture contact pieces and contacts for circuit breakers: Freeze cast and infiltrated contact material, e.g. WCCu, WCAg or CuCr, has a microstructure consisting of reinforced lamellas separated by pure Cu or Ag channels. Similar to a cable with separated strands, this provides enhanced thermal and electrical conductivity in the channel direction. At the same time, the strong reinforcement lamellas provide structural support like a reinforced composite material with a soft matrix. In the perpendicular direction the material naturally has a lower conductivity as the current must penetrate the reinforced walls.

Structurally, freeze cast composites are stronger along the lamella direction thus requiring lower reinforcement levels for similar mechanical performance compared to anisotropic composites.

As contact material, freeze cast materials use the reinforcement phases more efficient, thus combining good strength and contact performance while maintaining high electrical and thermal conductivity. Vice versa, freeze cast material can have higher reinforcement levels while still maintaining good conductivity (see FIGS. 6*a* and 6*b*).

In applications this can allow to: improve thermal conductivity and thermal management of contacts and thus for example reduce contact size for short-circuit performance; increase reinforcement levels at equal conductivity to save precious Ag; reduce electric losses in the bulk contact; and control the current flow in the contact by controlling lamella orientation.

Freeze cast Cu-40% WC was measured at an average chop current of ~5.07 A while maintaining an electrical conductivity of ~40 MS/m. By comparison, CuCr50 with a similar chop level achieved ~20 MS/m.

In an example, the providing the slurry of the reinforcement phase in liquid, comprises mixing a powder of the reinforcement phase and liquid. In an example, the freeze casting the slurry comprises freezing the slurry to form the frozen liquid structure comprising frozen liquid lamellas. In an example, the freeze casting the slurry comprises freezing the slurry to form the reinforcement phase structure comprising an anisotropic foam of the reinforcement phase. In an example, the freeze casting the slurry comprises freezing the slurry on a surface of a cold plate to form the cast. A contact surface of the contact piece corresponds to a surface of the cast facing away from the surface of the cold plate.

In an example, the freeze casting the slurry comprises controlling a cooling rate of the slurry to control one or more structure sizes of the frozen liquid structure. In an example, the frozen liquid structure comprises frozen liquid lamellas. The freeze casting the slurry comprises controlling the cooling rate of the slurry to control a thickness of the frozen liquid lamellas and/or controlling the cooling rate of the slurry to control a spacing between the frozen liquid lamellas.

In an example, the cooling rate of the slurry is controlled by a temperature of the cold plate and/or a rate of change of temperature of the cold plate.

In an example, the removing the frozen liquid comprises sublimating the frozen liquid from the cast. In an example, the removing the frozen liquid comprises freeze drying the cast.

In an example, the reinforcement phase comprises W, or WC, or Cr. In an example, the conductive phase comprises Cu, or Ag.

In an example, the method comprises machining the contact piece to form a finished contact piece.

In a second aspect, there is provided a method of forming a contact for a circuit breaker. The contact comprises a contact piece and a contact stem. The method of forming the contact comprises: forming the contact piece according to the first aspect; and connecting the contact piece to the contact stem.

In a third aspect, there is provided a contact piece for a circuit breaker formed according to the first aspect.

In a fourth aspect, there is provided a contact for a circuit breaker formed according to the second aspect.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for forming a contact piece for a circuit breaker, the contact piece comprising a reinforcement phase and a conductive phase, the method comprising:

providing a slurry of the reinforcement phase in liquid, wherein the liquid comprises an organic solvent;

freeze casting the slurry to form a cast comprising a frozen liquid structure and a reinforcement phase structure;

removing the frozen liquid structure from the cast to form a foam comprising the reinforcement phase structure;

sintering the foam to form a sintered foam; and infiltrating the sintered foam with the conductive phase to form a piece part;

wherein the reinforcement phase comprises WC, or Cr; and wherein the conductive phase comprises Cu, or Ag.

2. The method according to claim 1, wherein providing the slurry of the reinforcement phase in liquid comprises mixing a powder of the reinforcement phase and liquid.

3. The method according to claim 1, wherein freeze casting the slurry comprises freezing the slurry to form the frozen liquid structure comprising frozen liquid lamellas.

4. The method according to claim 1, wherein freeze casting the slurry comprises freezing the slurry to form the reinforcement phase structure comprising an anisotropic foam of the reinforcement phase.

5. The method according to claim 1, wherein freeze casting the slurry comprises freezing the slurry on a surface of a cold plate to form the cast.

6. The method according to claim 5, wherein a contact surface of the contact piece corresponds to a surface of the cast facing away from the surface of the cold plate.

7. The method according to claim 5, wherein freeze casting the slurry comprises controlling a cooling rate of the slurry to control one or more structure sizes of the frozen liquid structure.

8. The method according to claim 7, wherein the frozen liquid structure comprises frozen liquid lamellas, and wherein the freeze casting the slurry comprises controlling the cooling rate of the slurry to control a thickness of the frozen liquid lamellas.

9. The method according to claim 8, wherein controlling the cooling rate of the slurry further controls a spacing between the frozen liquid lamellas.

10. The method according to claim 7, wherein the cooling rate of the slurry is controlled by a temperature of the cold plate and/or a rate of change of temperature of the cold plate.

11. The method according to claim 1, wherein removing the frozen liquid comprises sublimating the frozen liquid from the cast.

12. The method according to claim 1, wherein removing the frozen liquid comprises freeze drying the cast.

13. The method according to claim 1, further comprising machining the contact piece to form a finished contact piece.

14. A method for forming a contact for a circuit breaker, the contact comprising a contact piece and a contact stem, the method comprising:

forming the contact piece by:

providing a slurry of the reinforcement phase in liquid, wherein the liquid comprises an organic solvent;

freeze casting the slurry to form a cast comprising a frozen liquid structure and a reinforcement phase structure;

removing the frozen liquid structure from the cast to form a foam comprising the reinforcement phase structure;

sintering the foam to form a sintered foam;

infiltrating the sintered foam with the conductive phase to form a piece part; and connecting the contact piece to the contact stem;

wherein the reinforcement phase comprises WC, or Cr; and wherein the conductive phase comprises Cu, or Ag.

* * * * *